(12) United States Patent
Feder et al.

(10) Patent No.: US 8,086,216 B2
(45) Date of Patent: Dec. 27, 2011

(54) MOBILITY AWARE POLICY AND CHARGING CONTROL IN A WIRELESS COMMUNICATION NETWORK

(75) Inventors: Peretz M. Feder, Englewood, NJ (US); Konstantin Livanos, Naperville, IL (US)

(73) Assignee: Alcatel Lucent, Paris (FR)

( * ) Notice: Subject to any disclaimer, the term of this patent is extended or adjusted under 35 U.S.C. 154(b) by 1148 days.

(21) Appl. No.: 11/849,758

(22) Filed: Sep. 4, 2007

(65) Prior Publication Data

US 2008/0229385 A1 Sep. 18, 2008

Related U.S. Application Data

(60) Provisional application No. 60/898,612, filed on Jan. 31, 2007.

(51) Int. Cl.
*H04M 11/00* (2006.01)
*H04W 4/00* (2009.01)
*H04W 36/00* (2009.01)

(52) U.S. Cl. ............... 455/405; 455/406; 455/432.1; 455/435.1; 455/442

(58) Field of Classification Search .......... 455/436, 455/442, 444, 432.1–435.3, 405–409; 370/338
See application file for complete search history.

(56) References Cited

U.S. PATENT DOCUMENTS

| 6,070,076 | A * | 5/2000 | Valentine ............. 455/445 |
| 7,773,571 | B1 * | 8/2010 | Maxwell et al. ........ 370/338 |
| 2007/0281699 | A1 * | 12/2007 | Rasanen ............. 455/436 |
| 2008/0046963 | A1 * | 2/2008 | Grayson et al. ........ 726/1 |

OTHER PUBLICATIONS

Telecommunications Industry Association, Project No. 3-4935.012, proposed creation of a new TIA Standard Service Based Bearer Control-State 2), Arlington, VA, Aug. 14, 2006 (Applicant Provided Prior Art).*

Communication relating to the results of the International Search Report from counterpart International Application No. PCT/US2008/000526 dated Feb. 10, 2008.
Written Opinion dated Feb. 10, 2008.
"QoS Concept-Call Flows for Split PCRF" 3GPP TSG SA WG2 Architecture, XX, XX, vol. S2H060371, Apr. 3, 2006, pp. 1-7.
"Project No. 3-4935.012, proposed creation of a new TIA Standard, Service Based Bearer CONTROL—Stage 2 SP-3-4935.012" EIA/TIA Drafts, Telecommunications Industry Association, Arlington, VA US Aug. 14, 2006.
3GPP TS 23.203 V7.1.0. $3^{rd}$ Generation Partnership Project; Technical Specification Group Services and System Aspects; Policy and charging control architecture (Release 7), Dec. 1, 2006.

* cited by examiner

*Primary Examiner* — Dwayne Bost
*Assistant Examiner* — Larry Sternbane
(74) *Attorney, Agent, or Firm* — Williams, Morgan & Amerson (57) ABSTRACT

One embodiment of the present invention provides a method for implementation in a policy control and charging rules functional entity in a wireless communication system. The method includes receiving, from at least one of a source policy and charging enforcement function in a source access network or a target policy and charging enforcement function in a target access network, information indicative of a mobile unit that has handed off from the source access network to the target access network. The method also includes establishing a first session for communicating policy and charging rules associated with the mobile unit. The first session is concurrent with a second session for communicating policy and charging rules associated with the mobile unit. The second session was previously established with the source policy and charging enforcement function in the source access network. The method further includes transmitting at least one policy and charging rule to the target policy and charging enforcement function using the first session.

20 Claims, 6 Drawing Sheets

MOBILITY AWARE POLICY AND CHARGING CONTROL IN A WIRELESS COMMUNICATION NETWORK

CROSS-REFERENCE TO PREVIOUS APPLICATION

This application claims the benefit of the filing date of U.S. Provisional Application Ser. No. 60/898,612, filed Jan. 31, 2007, entitled "WiMAX SIMULTANEOUS BINDING OF IP-CAN SESSIONS AND MAKE BEFORE BREAK HANDOVER"; the contents of the above-named provisional application is incorporated herein by reference.

BACKGROUND OF THE INVENTION

1. Field of the Invention

This invention relates generally to communication systems, and, more particularly, to wireless communication systems.

2. Description of the Related Art

Service providers typically provide numerous voice and/or data services to subscribers using one or more wired and/or wireless communication systems. Exemplary services include cellular telephony, access to the Internet, gaming, broadcasting or multicasting of audio, video, and multimedia programming, and the like. Mobile subscriber units such as cell phones, personal data assistants, smart phones, pagers, text messaging devices, global positioning system (GPS) devices, network interface cards, notebook computers, and desktop computers may access the services provided by the communication systems over an air interface with one or more base stations. The services are provided according to established and/or negotiated policies and the service providers typically charge the end-users for the services that are provided. For example, a cellular telephone service provider may charge an end-user for each minute of airtime that is used during voice communications. The billing rate may be determined based on a negotiated policy indicating the quality of service to be provided to the end user. For another example, end-users may be charged for each byte of data that is transmitted and/or received by the mobile unit operated by the end-user. Consequently, wireless communication systems implement various charging and policy control architectures.

Figure 1A:
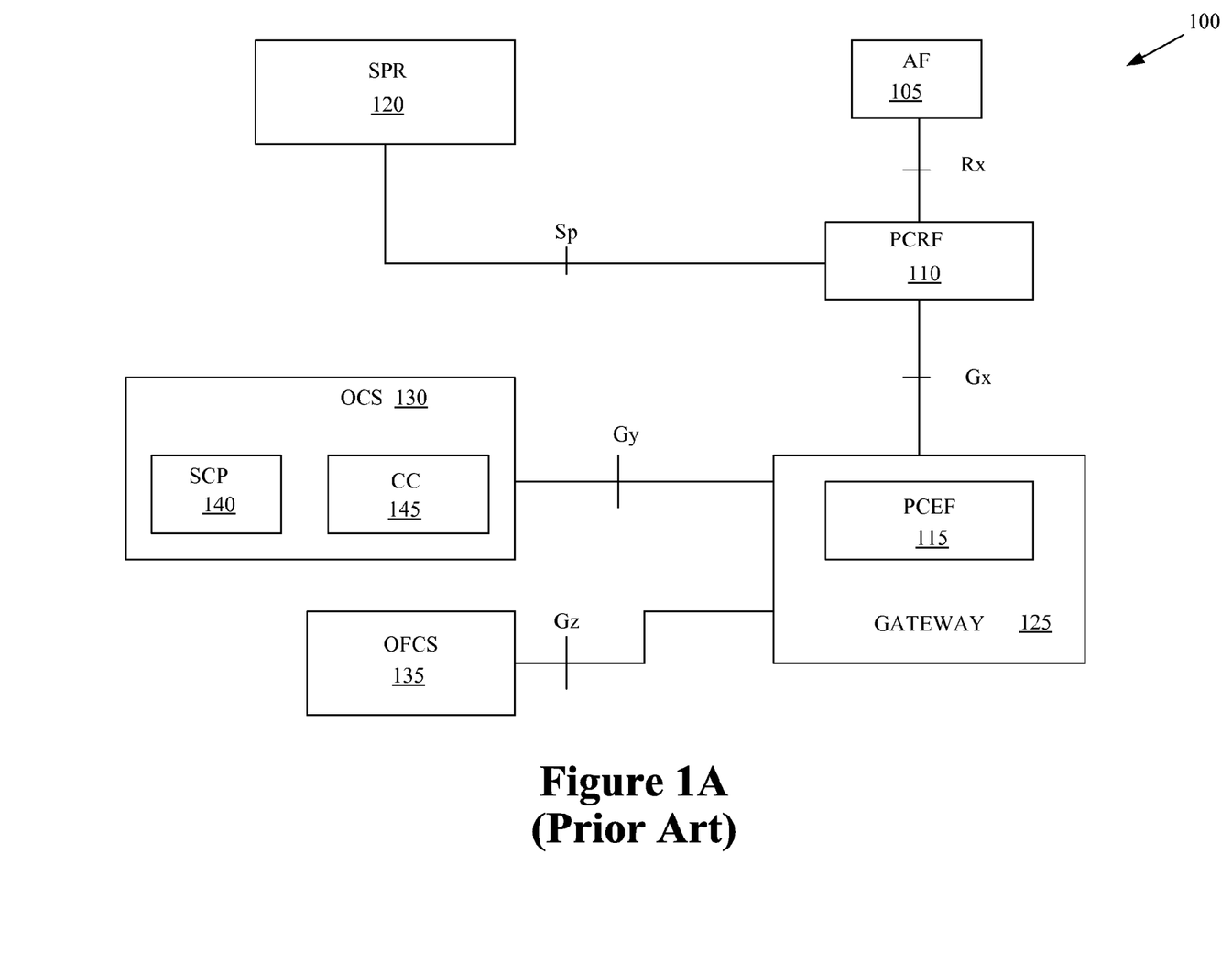
FIG. 1A conceptually illustrates a conventional policy and charging control architecture as defined by the Third Generation Partnership Project (3GPP) in the 3GPP Technical Specification 23.203 in accordance with the WiMAX standards.

FIG. 1A conceptually illustrates a conventional policy and charging control architecture 100 as defined by the Third Generation Partnership Project (3GPP) in the 3GPP Technical Specification 23.203 in accordance with the WiMAX standards. The conventional policy and charging control architecture 100 includes one or more application functions (AF) 105 that offer applications that require dynamic policy and/or charging control. Each application function 105 can communicate with a policy control and charging rules function (PCRF) 110 over an Rx interface. The PCRF 110 provides network control rules regarding the service data flow detection, gating, and quality of service and/or flow-based charging towards a policy control and enforcement function (PCEF) 115 over a Gx/Ty interface. For example, the PCRF 110 can determine various policy and charging control (PCC) rules and transmit these rules to the PCEF 115. In some cases, the PCRF 110 determines the PCC rules based upon subscription information associated with a subscriber and stored in a subscription profile repository (SPR) 120.

The PCEF 115 resides in a gateway 125 that may be part of an access serving network (not shown in FIG. 1) of the wireless communication system. For example, the PCEF 115 is located in the GGSN for a GPRS network and the PDG for a WLAN. Alternatively, in a system that operates according to the Third Generation Partnership Project 2 (3GPP2) standards, the PCEF 115 could be located in a packet data serving node (PDSN) that is implemented in a gateway entity. The gateway 125 communicates with an online charging system 130 and/or an off-line charging system 135 over the interfaces Gy and Gz, respectively. The online charging system 130 may include a CAMEL SCP 140 and/or a charging control function 145. The online charging system 130 provides charging control (CC) rules to the PCEF 115. The PCEF 115, in conjunction with the online charging system 130 and/or the off-line charging system 135, implements service data flow detection, policy enforcement, and flow-based charging functionalities in accordance with the PCC/CC rules established by the PCRF 110. For example, the PCEF 115 may implement gate enforcement, quality of service enforcement, and charging control using the PCC/CC rules associated with subscribers to various services to ensure proper deployment and enforcement of quality of service policies and accurate charging.

Figure 1B:
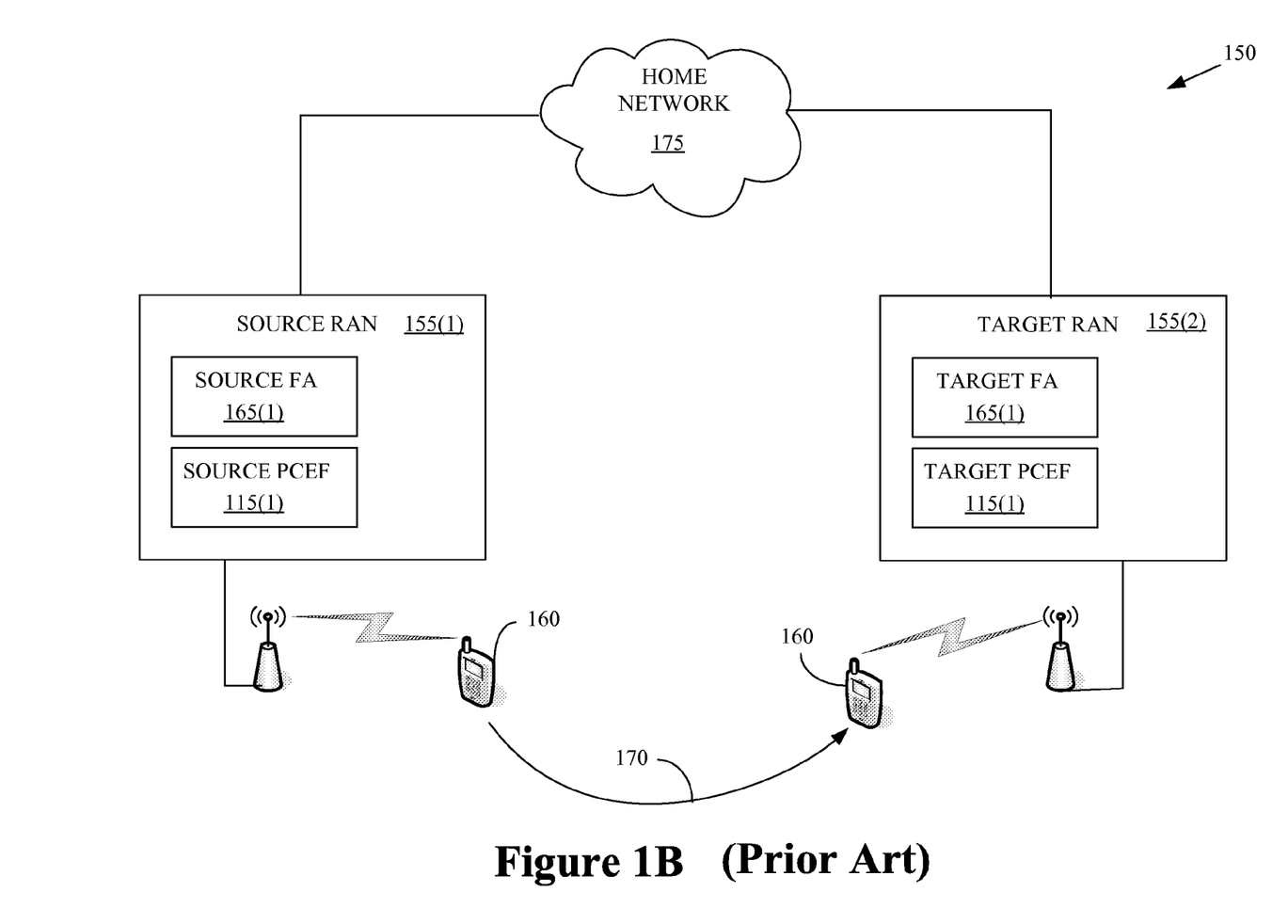
FIG. 1B conceptually illustrates a conventional network that supports mobility between a source radio access network and a target radio access network.

FIG. 1B conceptually illustrates a conventional network 150 that supports mobility between a source radio access network 155(1) and a target radio access network 155(2). The WiMAX standards support access serving network and core serving network initiated handovers of mobile unit 160 that cause the PCEF 115 and in some cases simultaneously the Foreign Agent 165 to move from the source radio access network 155(1) to the target radio access network 155(2), as indicated by the arrow 170. In the illustrated embodiment, the mobile unit 160 is registered with a home network 175. The handoff procedures can be initiated by either the mobile unit 160 or an entity in the network, e.g., as part of a network resource optimization procedure. Delays and/or interruptions in communication between the PCRF 110, the PCEF 115, and/or the OCS 130 may result in the new serving PCEF 115 not receiving the PCC and/or CC rules that are needed to enforce the policies and/or charging rules associated with the subscriber and may result in inaccurate charging for any services received by the subscriber.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for implementation in a policy control and charging rules functional entity in a wireless communication system. The method includes receiving, from at least one of a source policy and charging enforcement function in a source access network or a target policy and charging enforcement function in a target access network, information indicative of a mobile unit that has handed off from the source access network to the target access network. The method also includes establishing a first session for communicating policy and charging rules associated with the mobile unit. The first session is concurrent with a second session for communicating policy and charging rules associated with the mobile unit. The second session was previously established with the source policy and charging enforcement function in the source access network. The method further includes transmitting at least one policy and charging rule to the target policy and charging enforcement function using the first session.

In another embodiment of the present invention, a method is provided for implementation in an online charging system in a wireless communication system. The method includes receiving, from at least one of a source policy and charging enforcement function in a source access network or a target policy and charging enforcement function in a first access network, information indicative of a mobile unit that has handed off from the source access network to the target access network. The method also includes establishing, with the first policy and charging enforcement function, a first session for communicating credit control rules associated with the mobile unit. The first session is concurrent with a second session for communicating credit control rules associated with the mobile unit. The second session was previously established with the source policy and charging enforcement function in the source access network. The method also includes transmitting at least one credit control rule to the target policy and charging enforcement function using the first session.

In yet another embodiment of the present invention, a method is provided for implementation in a policy and charging enforcement functional entity in a target access network of a wireless communication system. The method includes transmitting, to a policy control and charging rules functional entity in the wireless communication system, information indicative of a mobile unit that has handed off from a source access network to the target access network. The method also includes establishing, with the policy control and charging rules function, a first session for communicating policy and charging rules associated with the mobile unit. The first session is concurrent with a second session for communicating policy and charging rules associated with the mobile unit. The second session was previously established with a source policy and charging enforcement function in the source access network. The method also includes receiving at least one policy and charging rule from the policy control and charging rules function using the first session.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, an air interface, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
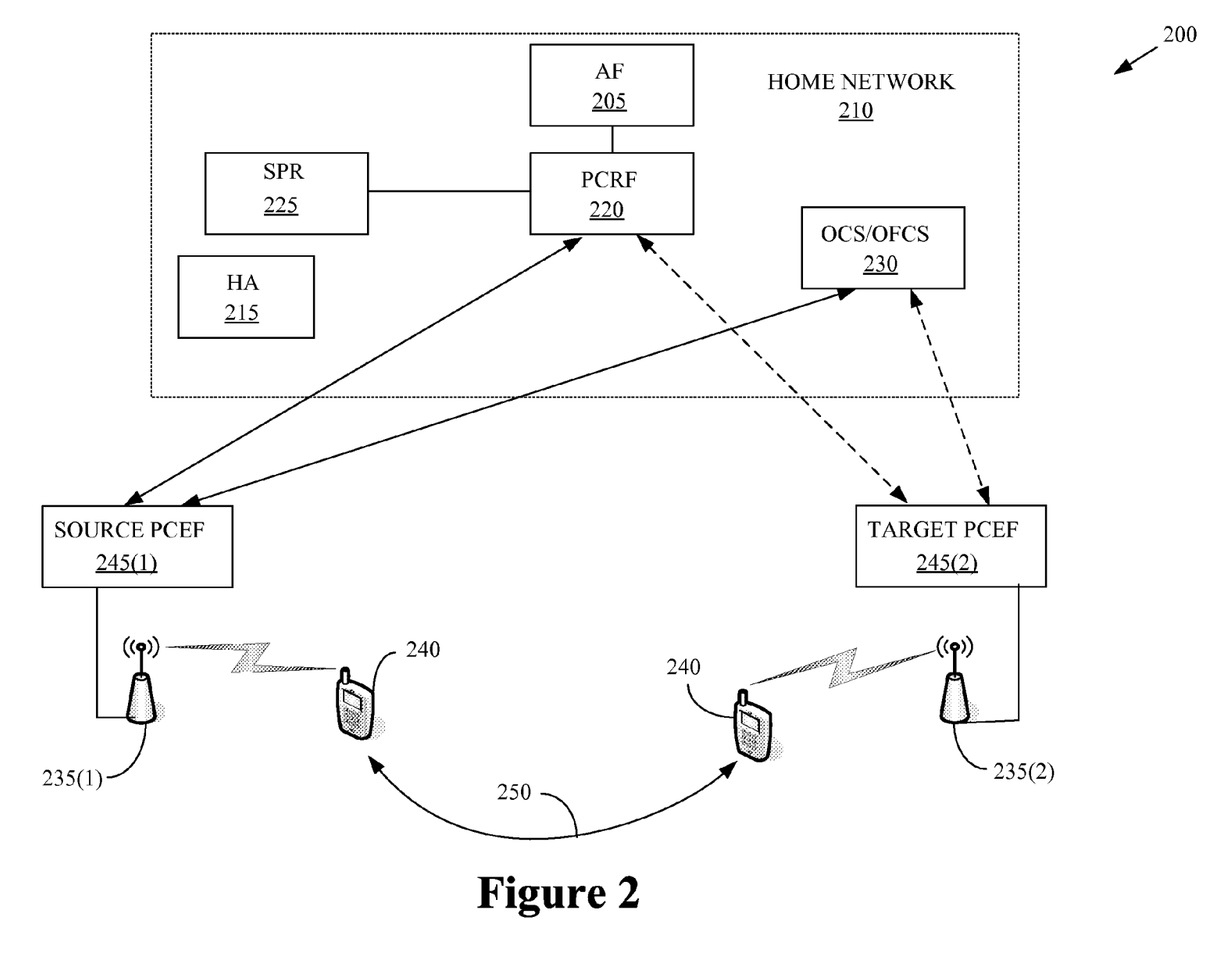
FIG. 2 conceptually illustrates a first exemplary embodiment of a wireless communication system, in accordance with the present invention.

FIG. 2 conceptually illustrates a first exemplary embodiment of a wireless communication system 200. In the illustrated embodiment, the wireless communication system 200 implements a policy and charging control architecture that performs dynamic policy and/or charging control for one or more application functions (AF) 205. Portions of the wireless communication system 200 may operate in accordance with the WiMAX standards established by the Third Generation Partnership Project (3GPP) in the 3GPP Technical Specification 23.203. Persons of ordinary skill in the art will appreciate that 3GPP does not specify all of the requirements for WiMAX systems and that the WiMAX standards are defined in the WiMAX forum. However, the present invention is not limited to wireless communication systems 200 that operate in accordance with the WiMAX standards. For example, in alternative embodiment, some or all of the wireless communication system 200 may operate according to one or more other radio access technologies such as Universal Mobile Telecommunication System (UMTS), Long Term Evolution (LTE) of the UMTS, and Code Division Multiple Access/Ultra-Mobile Broadband (CDMA/UMB). Furthermore, the wireless communication system 200 implements functionality that is not set forth in the 3GPP Technical Specification 23.203. In particular, embodiments of the wireless communication system 200 implements mobility-aware policy and charging control.

In the first exemplary embodiment, the application functions 205 are implemented in a home network 210 that may include a home agent 215. Each application function 205 can communicate with a policy control and charging rules function (PCRF) 220 over an Rx interface. The PCRF 220 provides network control regarding the service data flow detection, gating, quality of service charging, and/or flow-based charging. For example, the PCRF 220 can determine various policy and charging control (PCC) rules based upon subscription information associated with a subscriber and stored in a subscription profile repository (SPR) 225. The home network 210 also includes an online and/or off-line charging system (OCS/OFCS) 230 that may establish and distribute charging control (CC) rules. Techniques for implementing and/or operating the application functions 205, home agent 215, PCRF 220, SPR 225, and OCS/OFCS 230 are known in the art and in the interest of clarity only those aspects of implementing and/or operating these functional entities that are relevant to the present invention will be discussed herein.

The wireless communication system 200 also includes one or more base stations 235 that may be used to provide wireless connectivity to mobile units 240. Each base station is either associated with a policy control and enforcement function (PCEF) 245 or contains a PCEF, which may receive PCC rules from the PCRF 220 over a Gx interface. The base station 235 and the PCEF 245 may reside in a network element such as a gateway that may be part of an access serving network (not shown in FIG. 2) of the wireless communication system 200. For example, each PCEF 245 may be located in a GGSN for a GPRS network, PDG for a WLAN, PDSN for a 3GPP2 networks or ASN-GW in the case of WiMAX. Each PCEF 245 communicates with the OCS/OFCS 230 over the interfaces Gy and Gz, respectively. The OCS 230 provides charging control (CC) rules to the PCEF 245. The PCEF 245, in conjunction with the OCS/OFCS 230, implements service data flow detection, policy enforcement, and flow-based charging functionalities in accordance with the PCC/CC rules established by the PCRF 220. For example, the PCEF 245 may implement gate enforcement, quality of service enforcement, and charging control using the PCC/CC rules associated with subscribers to various services to ensure proper deployment and enforcement of quality of service policies and accurate charging.

In the illustrated embodiment, the mobile unit 240 has an established wireless communication link with the base station 235(1) and therefore is initially associated with the source PCEF 245(1). Consequently, the source PCEF 245(1) implements gate enforcement, quality of service enforcement, and charging control using the PCC/CC rules associated with the mobile unit 240. For example, the PCC/CC rules may be determined by the PCRF 220 and/or the OCS/OFCS 230 in response to the mobile unit 240 establishing the wireless communication link with the base station 235(1). The mobile unit 240 may handoff to other base stations such as the base station 235(2) while it is an active, sleep or an idle state. Reasons for the handoff may include moving into a different geographic areas served by the base station 235(2), changes in environmental conditions that improve channel conditions associated with the base station 235(2) and/or degrade channel conditions associated with the base station 235(1), changes in the loading of the base stations 235, and the like. In the illustrated embodiment, the base stations 235 operate according to the same wireless communication standards and/or protocols. However, persons of ordinary skill in the art having benefit of the present disclosure should appreciate that the present invention is not limited to handoffs between base stations 235 sharing the same radio access technology. In alternative embodiments, the base stations 235 may operate according to different radio access technologies, in which case the handoff may be an inter-radio access technology handoff.

The PCRF 220 and the OCS/OFCS 230 in the home network 210 are mobility aware and so they are able to implement soft handoffs (e.g., make-before-break handoffs) from the source PCEF 245(1) to the target PCEF 245(2) when the mobile unit 240 hands off to the base station 235(2), as indicated by the arrow 250. For example, the PCRF 220 may have an existing IP-CAN session with the source PCEF 245(1) that is used to install policy and/or per-flow charging rules on the source PCEF 245(1). The PCRF 220 may then initiate a concurrent IP-CAN session with the target PCEF 245(2) that is used to install policy and/or per-flow charging rules on the target PCEF 245(2). The initial IP-CAN session with the source PCEF 245(1) is not released until the policy and/or per-flow charging rules are successfully installed on the target PCEF 245(2). The OCS/OFCS 230 may also initiate concurrent sessions with the source and target PCEF 245 and use these sessions to install charging control rules on the target PCEF 245(2). Communication between the PCRF 220 and the source and target PCEFs 245 therefore remains uninterrupted during a mobile handover from a serving radio access network (RAN, or S-ASN for WiMAX systems) to a target RAN (T-ASN) while the PCEF 245 for the mobile unit 240 relocates to the target new serving RAN (new serving WiMAX ASN). The concurrent binding of sessions to both Source RAN and Target RAN combined with a make-before-break handover assure continuous enforcement of QoS policies and charging rules without service interruption. In the illustrated embodiment both the PCRF 220 and the OCS/OFCS 230 are mobility aware, however, this is not necessary for the practice of the present invention. In alternative embodiments only one of the PCRF 220 and the OCS/OFCS 230 may be mobility aware.

Figure 3:
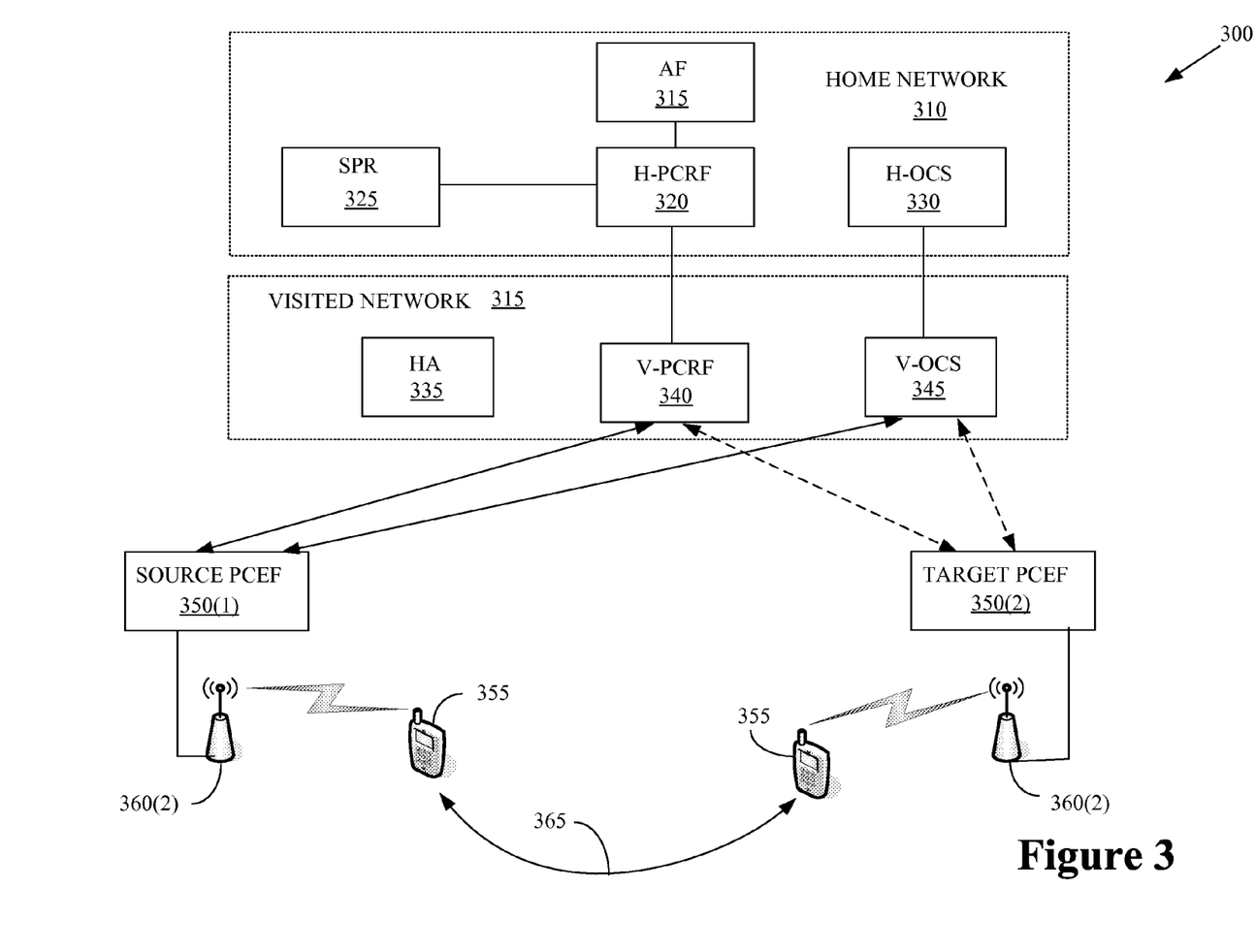
FIG. 3 conceptually illustrates a second exemplary embodiment of a wireless communication system that supports roaming, in accordance with the present invention.

FIG. 3 conceptually illustrates a second exemplary embodiment of a wireless communication system 300. As in the first exemplary embodiment, the second exemplary embodiment of the wireless communication system 300 implements a policy and charging control architecture that performs dynamic policy and/or charging control for one or more application functions (AF) 305. Portions of the wireless communication system 300 may therefore operate in accordance with the WiMAX standards established by the Third Generation Partnership Project (3GPP) in the 3GPP Technical Specification 23.203 and/or other standards. However, 3GPP does not specify all of the requirements for WiMAX systems. The WiMAX standards are defined in the WiMAX forum. In contrast to the first exemplary embodiment, the second exemplary embodiment of the wireless communication system 300 supports roaming from a home network 310 to a visited network 315. Although a single visited network 315 is depicted in FIG. 3, persons of ordinary skill in the art having benefit of the present disclosure should appreciate that the wireless communication system 300 may include any number of visited networks 315.

As in the first exemplary embodiment, each application function 305 can communicate with a policy control and charging rules function (H-PCRF) 320 over an Rx interface. The H-PCRF 320 provides network control regarding the service data flow detection, gating, quality of service charging, and/or flow-based charging. For example, the H-PCRF 320 can determine various policy and charging control (PCC) rules based upon subscription information associated with a subscriber and stored in a subscription profile repository (SPR) 325. The home network 310 also includes an online and/or off-line charging system (OCS) 330 that may establish and distribute charging control (CC) rules. However, in the second exemplary embodiment, the visited network 315 implements a visited PCRF 340 and a visited OCS 345, which may communicate with the home PCRF 320 and the home OCS 330 to establish various PCC/CC rules. The Home Agent, if present, can be located in the home network or assigned by the home network to the visited network as shown (335). The visited PCRF 340 and the visited OCS 345 are also mobility aware and so they are able to implement soft handoffs (e.g., make-before-break) from the source PCEF 350(1) to the target PCEF 350(2) when the mobile unit 355 hands off from the base station 360(1) to the base station 360(2), as indicated by the arrow 365, as discussed in detail herein.

Figure 4:
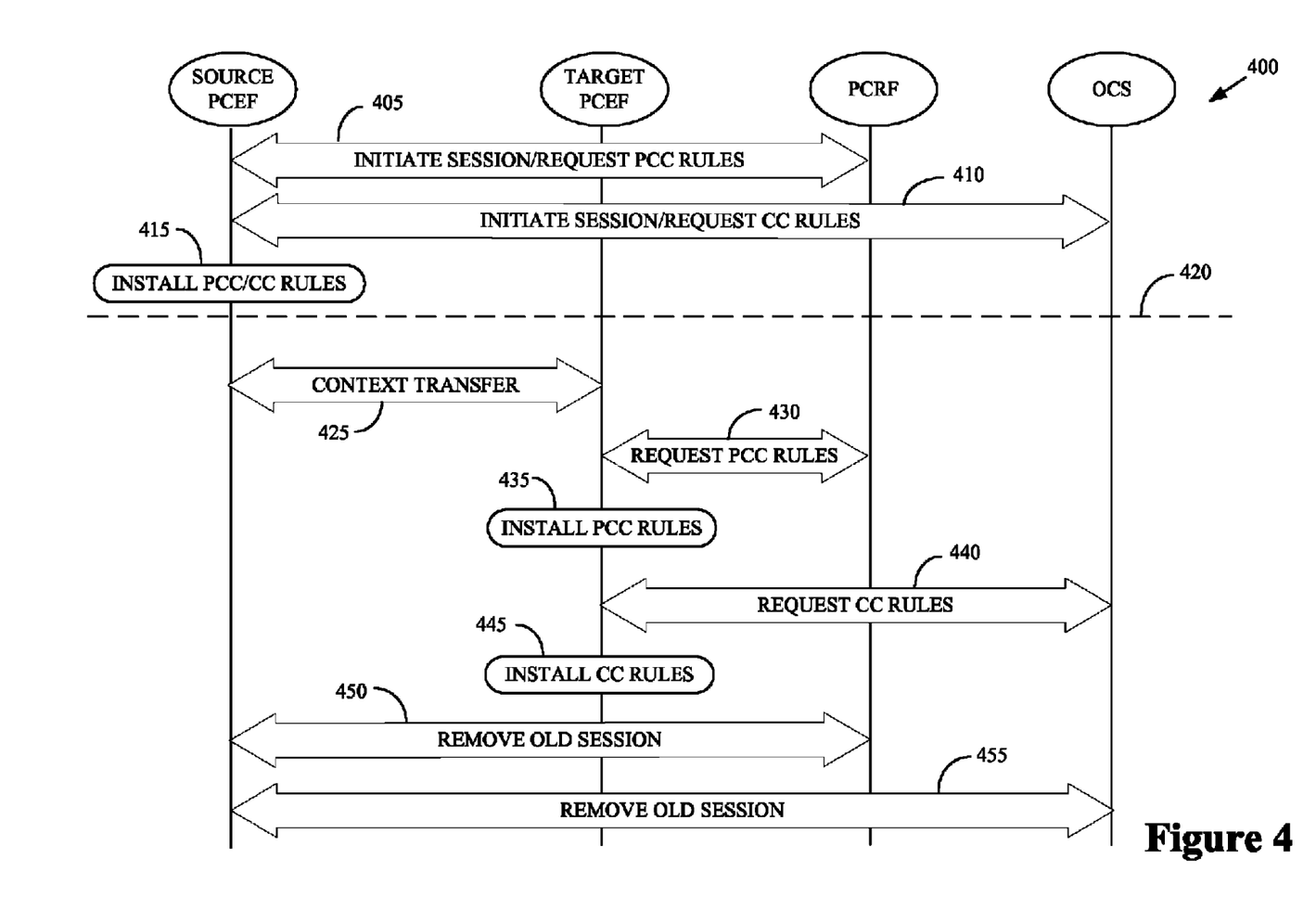
FIG. 4 conceptually illustrates one exemplary embodiment of a method of implementing mobility-aware policy and charging control, in accordance with the present invention.

FIG. 4 conceptually illustrates one exemplary embodiment of a method 400 of implementing mobility-aware policy and charging control. In the illustrated embodiment, the method 400 depicts procedures that may be used to initiate policy and charging control at a source policy and charging enforcement function (Source PCEF) using PCC rules established by a policy and charging rules function (PCRF) and an online charging system (OCS). The procedure begins in response to a mobile unit or the network requesting a new session. When the source PCEF receives a request for the new session, a communication/negotiation session is initiated with the PCRF, as indicated by the arrow 405. For example, an IP-CAN session may be established between the source PCEF and the PCRF. A communication/negotiation session may also be initiated with the OCS, as indicated by the arrow 410. In one embodiment, the communication/negotiation sessions are implemented as DIAMETER sessions that are used to communicate policy rules associated with mobile units on a pair-wise basis. For example, the DIAMETER session may include a signaling link implemented at the data link level that is used to exchange version information, state information, and/or capability information associated with two mobile units that are in communication with each other. In another embodiment, Radius messages can be used to communicate policy rules associated with a mobile unit.

The PCRF may determine and/or negotiate the PCC rules associated with the mobile unit using the established session and then transmit the PCC rules to the source PCEF. The OCS may determine and/or negotiate the CC rules associated with the mobile unit using the established session and then transmit the CC rules to the source PCEF. In one embodiment, a new relocation event/trigger may be communicated to the Source PCEF in the existing signaling sequence. For example, the PCRF may include a PCEF_RELOC trigger in a CCA message to the PCEF that instructs the PCEF to request re-authorization when the PCEF relocates, e.g., in response to hand over of a mobile unit. A relocation trigger may also be included in the CCA message from the OCS. This relocation trigger may instruct the PCEF to request updated CC rules when the PCEF relocates. The PCC/CC rules are then installed (at 415) under the control of the PCRF and the OCS. Once the PCC/CC rules have been installed (at 415) in the source PCEF, the initialization is complete and the mobile unit operates under control of the source PCEF, as indicated by the dashed line 420.

When the mobile unit is handed off from the source PCEF to the target PCEF, a context transfer is performed between the source PCEF and the target PCEF, as indicated by the arrow 425. In one embodiment, the context transfer utilizes known context transfer algorithms but incorporates new parameters in the context transfer in order to facilitate the implementation of the mobility aware PCRF and OCS. For example, the new parameters may be used to verify that PCC/CC rules associated with the mobile unit are installed at the target PCEF before they are removed from the source PCEF. In one embodiment, the modified context transfer includes the IP address of the mobile unit, the IP address of the PCRF and a correlation identifier. The IP address of the PCRF enables the target PCEF to contact the same PCRF that handles the connection to the source PCEF. The correlation identifier enables the OCS to correlate the records created by the old PCEF with those by the target PCEF. For example, the correlation identifier CORREL_ID may be set to the value of the DIAMETER <session-id> that uniquely identifies the mobile unit session between the source PCEF and the OCS.

The target PCEF then initiates a communication/negotiation session with the PCRF, as indicated by the arrow 430. For example, the existing IP-CAN session may be extended or continued to include the target PCEF and the PCRF. A new DIAMETER session may also be established (at 430) between the target PCEF and the PCRF. In one embodiment, the communication session between the target PCEF and the PCRF are initiated when the target PCEF sends an indication of the handoff to the PCRF. Alternatively, the source PCEF may transmit an indication of the impending handoff to the PCRF so that the PCRF can begin setting up the communication session prior to receiving the indication from the target PCRF. The PCRF may determine and/or negotiate the PCC rules associated with the mobile unit using the established session and then transmit the PCC rules to the target PCEF, which may install (at 435) the new PCC rules. For example, the target PCEF may send a CCR message to the PCRF requesting an update of the PCC rules with the event trigger set to "PCEF-RELOC" as the reason for the re-authorization request. The PCRF responds with the new PCC rules in a CCA message and the new PCC are installed (at 435) at the target PCEF.

A communication/negotiation session may also be initiated between the target PCEF and the OCS, as indicated by the arrow 440. For example, the PCEF may send a request to the OCS for updated CC rules with "PCEF_RELOC" as the trigger for re-authorization. In one embodiment, the request includes the CORREL_ID that identifies the session between the OCS and the source PCEF. The OCS may determine and/or negotiate the CC rules associated with the mobile unit using the established session and then transmit the CC rules to the target PCEF, which may install (at 445) the new CC rules. These sessions operate concurrently with the previously initiated sessions between the source PCEF and the PCRF and/or OCS. Consequently, the source PCEF may continue to maintain policy and charging control while the target PCEF is being configured and preparing to assume policy and charging control for the handed off mobile unit.

Once handoff of the PCEF is complete, the old sessions between the source PCEF and the PCRF/OCS may be removed, as indicated by the arrows 450, 455. For example, the mobile unit's DIAMETER session between the PCRF and the source ASN may be removed. In one embodiment, a final credit report may be transferred from the source PCEF to the OCS as part of the session removal process. The CORREL_ID enables the OCS to correlate the final credit report with the record created by the target PCEF. For each mobile unit that is handed off, the PCEF maintains two concurrent sessions for a transient period of time before the session with the source PCEF is removed. To deal with this condition and to correctly send PCC rules updates requested by an application function and/or a Subscriber Policy Repository (SPR), the PCRF may implement double-binding (DB) resolution FIG. 5 conceptually illustrates one exemplary embodiment of a method 500 of double binding resolution. The method 500 may be implemented concurrently with portions of the method 400 depicted in FIG. 4. In one embodiment, the method 500 may be initiated concurrently with removal (at 450) of the old sessions between the source PCEF and the PCRF, as shown in FIG. 4. For example, the method 500 may be implemented after a CCR is sent to the source PCEF to indicate that the source PCEF should tear down the associated session with the mobile unit and before the CCA message is received by the target PCEF. In the illustrated embodiment, a new diameter session is established (at 505) between the target PCEF and the PCRF. A flag indicating that double binding resolution is in use is set (at 510) at the PCRF and a profile associated with the user and stored on the SPR is also changed (at 515) in response to establishing the new diameter session. For example, the network service provider may change the subscriber's profile to add/remove services that the subscriber is allowed to access. For another example, the network service provider may change the subscriber's profile to upgrade/downgrade the QoS the subscriber that is "entitled" to receive.

Figure 5:
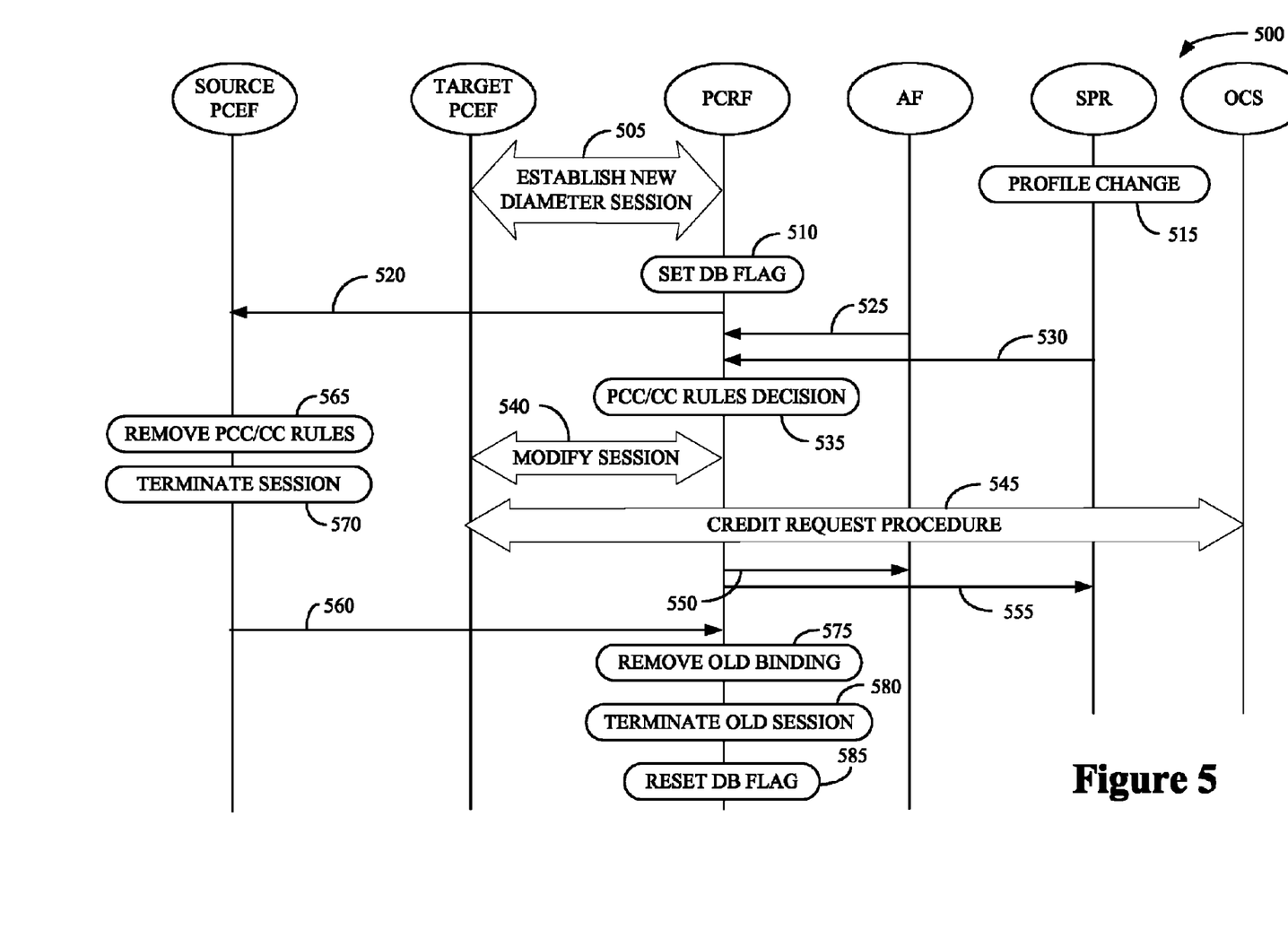
FIG. 5 conceptually illustrates one exemplary embodiment of a method of double binding resolution, in accordance with the present invention.

The PCRF transmits a Remove PCC Rules Request message to the source PCEF, as indicated by the arrow 520, which asks the source PCEF to remove the existing rules that are used for policy and charging control associated with the handed off mobile unit. If either the application function (AF) or the subscriber profile repository requests an update of the existing rules from the PCRF, as indicated by the arrows 525, 530, the PCRF decides (at 535) whether and/or how to modify the PCC and/or CC rules. The PCRF and the target PCEF may then modify (at 540) the session in accordance with the revised PCC/CC rules. The target PCEF may also perform (at 545) a credit request procedure with the OCS based on the revised PCC/CC rules. The PCRF may then confirm any changes that are made to the existing rules with the application function and/or the subscriber profile repository, as indicated by the arrows 550, 555. The double binding resolution procedure that is illustrated by the steps 525, 530, 535, 540, 545, 550, 555 may be repeated until the PCRF receives (at 560) confirmation that the PCC/CC rules on the source PCEF have been removed and the session with the source PCEF has been terminated.

After the source PCEF has received the Remove Rules Request message from the PCRF, the source PCEF removes (at 565) the existing PCC/CC rules and terminates (at 570) the associated session. Removal (at 565) of the existing PCC/CC rules and termination (at 570) of the associated session may proceed concurrently with other actions in the system such as modification (at 515) of profiles stored in the subscriber profile repository and changes in the application function, as well as the steps used to resolve double binding issues, as discussed herein. When the source PCEF has removed (at 565) the existing PCC/CC rules and terminated (at 570) the associated session (at 560), the source PCEF transmits (at 560) confirmation that the PCC/CC rules on the source PCEF have been removed and the session with the source PCEF has been terminated. The PCRF may then remove (at 575) the old binding to the source PCEF, terminate (at 580) the associated session, and reset (at 585) the double binding flag to indicate that only a single binding exists for the associated mobile unit.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method for implementation in a policy control and charging rules function (PCRF) in a wireless communication system, comprising:

receiving, at the PCRF from a policy and charging enforcement function (PCEF) in a gateway of at least one of a source access network or a target access network, information indicative of a mobile unit that has handed off from the source access network to the target access network;

establishing, between the PCRF and the PCEF in the gateway of the target access network, a first session for communicating policy and charging rules associated with the mobile unit, the first session being substantially concurrent with a second session for communicating policy and charging rules associated with the mobile unit, the second session being previously established between the PCRF and the PCEF in the gateway of the source access network; and transmitting at least one policy and charging rule from the PCRF to the PCEF in the gateway of the target access network using the first session, wherein the second session is not released until said at least one policy and charging rule is installed on the PCEF in the gateway of the target access network.

2. The method of claim 1, wherein receiving the information indicative of the mobile unit comprises receiving an identifier indicative of the mobile unit and an event indicating that the mobile unit has handed off from the source access network to the target access network.

3. The method of claim 1, wherein establishing the first session comprises determining that the second session has previously been established with the PCEF in the gateway of the source access network.

4. The method of claim 1, comprising transferring at least one context to the PCEF in the gateway of the target access network, wherein said at least one context includes at least one parameter that verifies that said at least one policy and charging rule is installed at the PCEF in the gateway of the target access network before said at least one policy and charging rule is removed from the PCEF in the gateway of the source access network.

5. The method of claim 1, wherein the mobile unit is accessing at least one service provided by at least one application function, and comprising transmitting at least one event notification to said at least one application function in response to receiving the information indicative of the mobile unit that has handed off from the source access network to the target access network.

6. The method of claim 1, wherein the PCEF in the gateway of the source access network continues to maintain policy and charging control for the handed off mobile unit while the PCEF in the gateway of the target access network is configured and prepares to assume policy and charging control for the handed off mobile unit.

7. The method of claim 1, comprising performing at least one credit request procedure in response to transmitting said at least one policy and charging rule.

8. The method of claim 7, comprising initiating removal of the second session in response to successfully performing said at least one credit request procedure.

9. A method for implementation in an online charging system (OCS) in a wireless communication system, comprising:

receiving, at the OCS from policy and charging enforcement function (PCEF) in a gateway of at least one of a source access network or a target access network, information indicative of a mobile unit that has handed off from the source access network to the target access network;

establishing, between the OCS and the PCEF in the gateway of the target access network, a first session for communicating credit control rules associated with the mobile unit, the first session being concurrent with a second session for communicating credit control rules associated with the mobile unit, the second session being previously established between the OCS and the PCEF in the gateway of the source access network; and transmitting at least one credit control rule to the PCEF in the gateway of the target access network using the first session, wherein the second session is not released until said at least one credit control rule is installed on the PCEF in the gateway of the target access network.

10. The method of claim 9, wherein receiving the information indicative of the mobile unit comprises receiving a correlation identifier indicative of the second session.

11. The method of claim 10, comprising receiving a final credit report associated with the mobile unit and the PCEF in the gateway of the source access network.

12. The method of claim 11, comprising receiving information indicative of a credit record formed by the PCEF in the gateway of the target access network in response to receiving said at least one credit control rule.

13. The method of claim 12, comprising correlating the credit record with the final credit report using the correlation identifier indicative of the second session.

14. A method for implementation in a policy and charging enforcement function (PCEF) in a gateway of a target access network of a wireless communication system, comprising:

transmitting, from the PCEF in the gateway of the target access network to a policy control and charging rules function (PCRF) in the wireless communication system, information indicative of a mobile unit that has handed off from a source access network to the target access network;

establishing, between the PCEF in the gateway of the target access network and the PCRF, a first session for communicating policy and charging rules associated with the mobile unit, the first session being concurrent with a second session for communicating policy and charging rules associated with the mobile unit, the second session being previously established between the PCRF and a PCEF in a gateway of the source access network; and receiving, at the PCEF in the gateway of the target access network, at least one policy and charging rule from the PCRF using the first session, wherein the second session is not released until said at least one policy and charging rule is installed on the PCEF in the gateway of the target access network.

15. The method of claim 14, comprising receiving a context transfer from the PCEF in the gateway of the source access network, wherein the context transfer includes at least one parameter that verifies that said at least one policy and charging rule is installed at the PCEF in the gateway of the target access network before said at least one policy and charging rule is removed from the PCEF in the gateway of the source access network.

16. The method of claim 15, wherein transmitting the information indicative of the mobile unit comprises transmitting the information indicative of the mobile unit in response to receiving the context transfer.

17. The method of claim 14, wherein transmitting the information indicative of the mobile unit comprises transmitting an identifier indicative of the mobile unit and an event indicating that the mobile unit has handed off from the source access network to the target access network.

18. The method of claim 14, wherein the PCEF in the gateway of the source access network continues to maintain policy and charging control for the handed off mobile unit while the PCEF in the gateway of the target access network is configured and prepares to assume policy and charging control for the handed off mobile unit.

19. The method of claim 14, comprising providing, to an online charging system in the wireless communication system, signaling including information indicative of the mobile unit and a correlation identifier indicative of the second session.

20. The method of claim 19, comprising receiving at least one credit control rule associated with the mobile unit from the online charging system in response to providing the signaling to the online charging system.

* * * * *